(12) United States Patent
Shimazaki et al.

(10) Patent No.: US 7,375,651 B2
(45) Date of Patent: May 20, 2008

(54) PARKING ASSISTANCE APPARATUS

(75) Inventors: Kazunori Shimazaki, Aichi (JP); Tomio Kimura, Aichi (JP); Satoshi Yamamoto, Aichi (JP)

(73) Assignee: Kabushiki Kaisha Toyota Jidoshokki, Kariya-shi (JP)

( * ) Notice: Subject to any disclaimer, the term of this patent is extended or adjusted under 35 U.S.C. 154(b) by 210 days.

(21) Appl. No.: 10/558,061

(22) PCT Filed: Apr. 12, 2005

(86) PCT No.: PCT/JP2005/007363

§ 371 (c)(1),
(2), (4) Date: Nov. 22, 2005

(87) PCT Pub. No.: WO2005/102823

PCT Pub. Date: Nov. 3, 2005

(65) Prior Publication Data

US 2007/0010918 A1 Jan. 11, 2007

(30) Foreign Application Priority Data

Apr. 19, 2004 (JP) ............................. 2004-122880
May 28, 2004 (JP) ............................. 2004-160009

(51) Int. Cl.
*B60Q 1/48* (2006.01)
*G05D 1/00* (2006.01)
*B60S 9/205* (2006.01)
(52) U.S. Cl. ................... 340/932.2; 340/425.5; 180/199; 382/104; 701/1; 701/41
(58) Field of Classification Search ............. 340/932.2; 180/199
See application file for complete search history.

(56) References Cited

U.S. PATENT DOCUMENTS

| 6,344,805 | B1 * | 2/2002 | Yasui et al. ............... 340/932.2 |
| 6,487,481 | B2 * | 11/2002 | Tanaka et al. ................ 701/41 |
| 6,611,744 | B1 * | 8/2003 | Shimazaki et al. ........... 701/41 |
| 2002/0123829 | A1 * | 9/2002 | Kuriya et al. .................. 701/1 |

(Continued)

FOREIGN PATENT DOCUMENTS

DE          103 38 255          3/2004

(Continued)

*Primary Examiner*—Donnie L. Crosland
(74) *Attorney, Agent, or Firm*—Morgan & Finnegan, LLP

(57) ABSTRACT

In a parking assistance apparatus disclosed herein, when a lateral parking mode switch is set at an initial stop position A, a controller calculates a backward movement start position B for parking based on a yaw angle and a steering angle of a vehicle, and issues guiding information to stop the vehicle upon having determined that the vehicle has reached the calculated backward movement start position B. After having sensed that a shift lever was shifted to a reverse position, the controller displays on a display an image captured by a camera as to an area behind the vehicle, and also displays on the display in a superimposed manner an estimated vehicle space in the case where the vehicle moves backwards while maintaining a steering angle at the time of the shift of the shift lever. The driver operates a steering wheel so as to establish a suitable positional relation between the estimated vehicle space and a target parking space on the display, whereby an appropriate steering angle is obtained in moving the vehicle backwards.

21 Claims, 7 Drawing Sheets

U.S. PATENT DOCUMENTS

2003/0080877 A1* 5/2003 Takagi et al. ............ 340/932.2
2003/0156045 A1* 8/2003 Tanaka et al. ........... 340/932.2

FOREIGN PATENT DOCUMENTS

| | | |
|---|---|---|
| EP | 1 123 844 | 8/2001 |
| JP | 5-322592 | 12/1993 |
| JP | 2002-251632 | 9/2002 |
| JP | 2003-205807 | 7/2003 |
| JP | 2003-212073 | 7/2003 |
| JP | 2004-074988 | 3/2004 |

* cited by examiner

PARKING ASSISTANCE APPARATUS

TECHNICAL FIELD TO WHICH THE INVENTION BELONGS

The present invention relates to a parking assistance apparatus, and more particularly, to an apparatus providing a driver with guidance on a driving operation in lateral parking.

PRIOR ART

Conventionally, there has been developed a driving assistance apparatus providing assistance in a driving operation by displaying on a display an image captured by a surveillance camera mounted to a vehicle during a backward movement thereof, and also displaying on the display an estimated locus corresponding to a steering angle of a steering wheel to be superimposed on the image displayed, as disclosed in, for example, JP-2002-251632 A.

The driving assistance apparatus as described above allows a driver to perform, for example, lateral parking of a vehicle in a parking space by driving the vehicle while viewing the estimated locus on the display.

PROBLEM TO BE SOLVED BY THE INVENTION

However, despite an attempt to stop the vehicle and move it backwards to perform lateral parking in the parking space, the estimated locus on the display may not reach the parking space unless the vehicle is stopped at a right position. In such a case, the vehicle cannot be parked unless it is moved and stopped at another position.

In general, since no image transmitted from the camera is displayed on the display during a forward movement, the driver has no choice but to play a hunch in finding a stop position for starting a backward movement. Thus, it does not suffice as parking assistance to simply display the estimated locus in moving backwards on the display.

Moreover, a mere display of the locus raises a problem of the lack of user-friendliness because it is unclear in which part and how the locus should be matched to a target parking space.

The present invention has been made as a solution to the above problems. It is an object of the present invention to provide a parking assistance apparatus allowing a driver to park a vehicle reliably and easily without having to play a hunch.

MEANS FOR SOLVING THE PROBLEM

According to the present invention, there is provided a parking assistance apparatus for providing assistance in a driving operation of parking a vehicle in a target parking space by moving the vehicle forwards from an initial stop position with a steering wheel turned, stopping the vehicle at a backward movement start position, and moving the vehicle backwards with the steering wheel turned in the opposite direction, the parking assistance apparatus comprising: a camera for capturing an image behind the vehicle; a display arranged near a driver seat of the vehicle; a steering angle sensor for detecting a steering angle; yaw angle detection means for detecting a yaw angle of the vehicle; guiding means for issuing guiding information on the driving operation to a driver; and a controller for acquiring a momentary position of the vehicle and a momentary yaw angle of the vehicle based on a steering angle detected by the steering angle sensor and a yaw angle of the vehicle detected by the yaw angle detection means when the vehicle moves forwards from the initial stop position, for issuing guiding information to stop the vehicle via the guiding means as soon as or some time after the vehicle has entered a region where is the backward movement start position defined by a parking-permitting position and a parking-permitting yaw angle, for displaying the image captured by the camera on the display when the vehicle moves backwards, and for displaying on the display in a superimposed manner an estimated vehicle space in the case where the vehicle moves backwards with a current steering angle detected by the steering angle sensor being maintained, the estimated vehicle space moving according to the current steering angle, to thereby inform the driver of a suitable steering angle in moving the vehicle backwards.

It should be noted herein that the backward movement start position does not only mean a specific position but a position within an allowable (parking-permitting) range.

EMBODIMENT MODES FOR CARRYING OUT THE INVENTION

The embodiments of the present invention will be described hereinafter based on the accompanying drawings.

Figure 1:
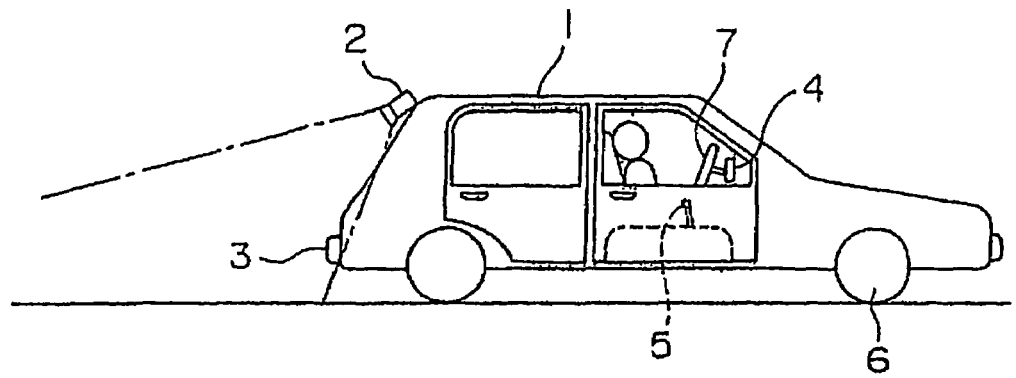
FIG. 1 is a side view of a vehicle mounted with a parking assistance apparatus according to an embodiment of the present invention.

As shown in FIG. 1, a rear view surveillance camera 2 for capturing an image behind a vehicle 1 is mounted to a rear portion of the vehicle 1. A rear bumper 3 of the vehicle 1 is captured in a lower end portion of a visible range of the camera 2. A liquid-crystal color display 4 is arranged near a driver seat of the vehicle 1. When a parking assistance operation is performed based on the present invention, an image captured by the camera 2 is displayed on the display 4, which is usually employed as a display unit for a navigation system. Further, a shift lever 5 is disposed beside the driver seat. Front wheels 6 as steering tired wheels are steered by operating a steering wheel 7.

Figure 2:
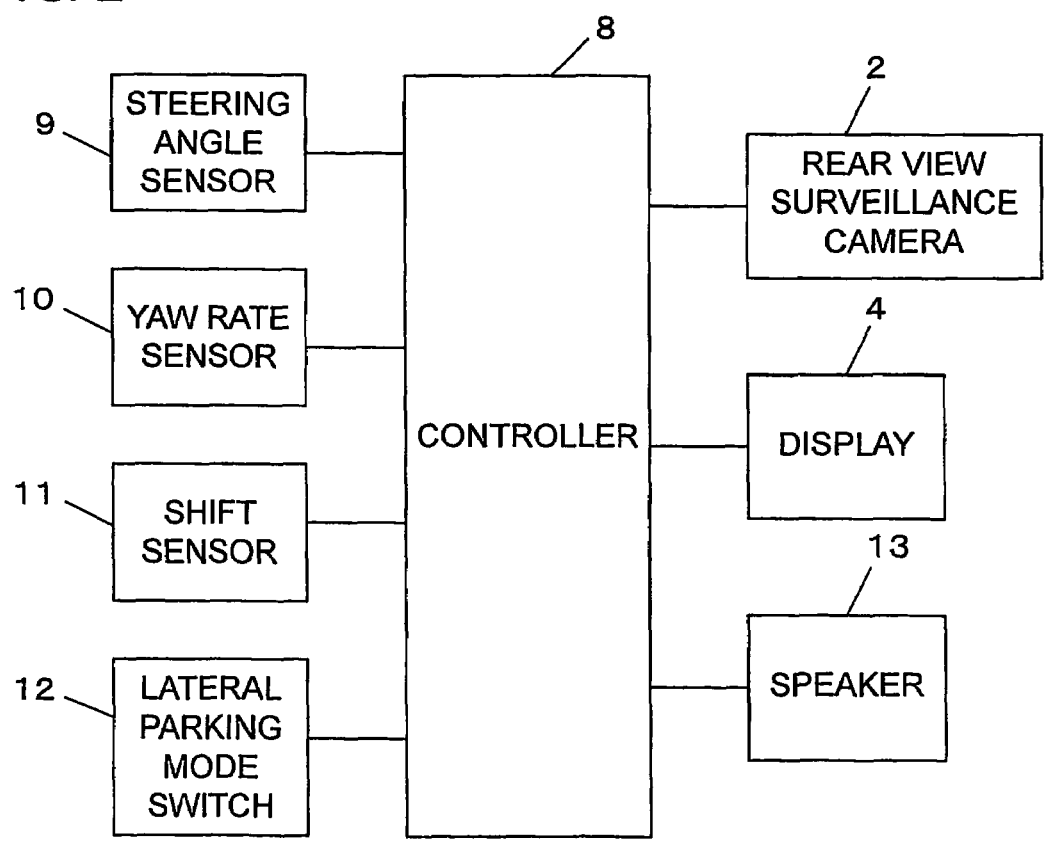
FIG. 2 is a block diagram showing the construction of the parking assistance apparatus according to the embodiment.

FIG. 2 shows a construction of a parking assistance apparatus according to a first embodiment of the present invention. A controller 8 is connected to the camera 2 and the display 4. A steering angle sensor 9 for detecting a steering angle of the steering wheel 7, a yaw rate sensor 10 for detecting an angular speed of the vehicle 1 in its yaw angle direction, and a shift sensor 11 generating a backward movement signal when the shift lever 5 is shifted to a reverse position are connected to the controller 8. In addition, a lateral parking mode switch 12 for informing the controller 8 that the vehicle 1 is to perform lateral parking is also connected to the controller 8. Furthermore, a speaker 13 for guiding the driver with information on driving operations is connected to the controller 8.

The controller 8 is provided with a CPU (not shown), a ROM (not shown) in which a control program is stored, and a working RAM (not shown).

Data specific to the vehicle and the control program are stored in the ROM. The data include a minimum turning radius Rmin in the case where the vehicle 1 makes a turn with its steering wheel 7 turned by a maximum amount, and the control program performs parking assistance when the vehicle 1 is performing lateral parking. The CPU operates based on the control program stored in the ROM.

When the lateral parking mode switch 12 is thrown, the controller 8 calculates a yaw angle of the vehicle 1 by integrating its angular speed which is input from the yaw rate sensor 10, and obtains a backward movement start position defined by a parking-permitting position and a parking-permitting yaw angle based on the calculated yaw angle. If it is determined based on a steering angle and a yaw angle during a forward movement that the vehicle 1 has reached the backward movement start position, the controller 8 issues guiding information via the speaker 13 to urge the driver to stop the vehicle.

The controller 8 also determines whether or not the driver has actually stopped the vehicle at the backward movement start position. If the position is determined to be inappropriate, the controller 8 informs the driver of this inappropriateness acoustically or otherwise.

Sensing by means of the shift sensor 11 that the shift lever 5 has been shifted to the reverse position, the controller 8 displays an image captured by the camera 2 as to an area behind the vehicle as well as an estimated vehicle space in the case where the vehicle has moved backwards by a predetermined target turning angle while maintaining a steering angle detected by the steering angle sensor 9 on the display 4 in a superimposed manner. This estimated vehicle space moves on the display 4 according to the steering angle. A suitable steering angle in moving backwards is obtained when the driver operates the steering wheel 7 so as to establish a suitable positional relation between the estimated vehicle space and a target parking space on the display 4.

Figure 3:
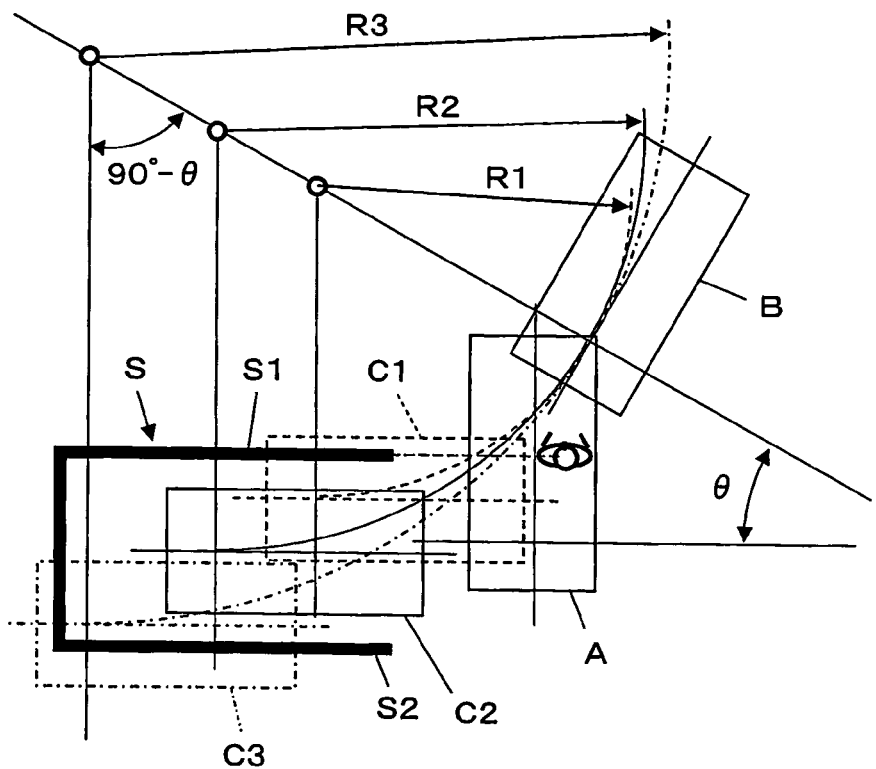
FIG. 3 gradationally and schematically shows the position of a vehicle when it is laterally parked according to the embodiment.

Referring to FIG. 3, the operation in performing lateral parking will now be described specifically. First of all, the vehicle is initially stopped when it is substantially perpendicular to a target parking space S and about 0.5 to 1 m apart from an entrance of the target parking space S with the driver seat corresponding to a predetermined position of the target parking space S, for example, when a front frame line S1 of the target parking space S is located just beside the driver. This vehicle position is defined as an initial stop position A.

If the driver throws the lateral parking mode switch 12 at the initial stop position A, the controller 8 recognizes the start of parking guidance and causes the speaker 13 to provide an audio guidance such as "You will now be provided with guidance on lateral parking. Please turn the steering wheel, move forwards, and stop upon the issuance of a sign." As soon as the lateral parking mode switch 12 is thrown, the controller 8 sets a yaw angle of the vehicle 1 at the initial stop position A as a reference position for a yaw angle.

The driver operates the steering wheel 7 and moves the vehicle 1 forwards while making a turn. In the case shown in FIG. 3, the driver slowly moves the vehicle 1 forwards while turning the steering wheel 7 to the right. At this moment, the controller 8 acquires a steering angle detected by the steering angle sensor 9 and an angular speed of the vehicle 1 input from the yaw rate sensor 10, and grasps the yaw angle and position of the vehicle 1 with respect to the target parking space S, for example, by integrating data on the steering angle and angular speed which have been acquired from the initial stop position A where the lateral parking mode switch 12 is thrown. In other words, the controller 8 calculates a momentary yaw angle by integrating a momentary angular speed, obtains a turning radius from a momentary steering angle, integrates a moving distance of the vehicle 1 on the assumption that the vehicle 1 moves by an amount of change in the momentary yaw angle in that state, and calculates a current relative position of the vehicle 1 with respect to the initial stop position A. The steering angle need not be held constant but may be changed in a midcourse.

If it is determined that the vehicle 1 has moved forwards while making a turn by an angle θ from the initial stop position A and then reached a backward movement start position B for moving the vehicle backwards to park in the target parking space S, the controller 8 provides the driver with guiding information as an instruction to stop the vehicle. For instance, audio guidance such as "Dingdong! Please operate the steering wheel and move slowly backwards to make sure that the yellow frame matches the target position." is issued from the speaker 13. The backward movement start position B means a region permitting arrival within the target parking space S by moving the vehicle 1 backwards with the steering wheel 7 fixed at a certain steering angle (i.e., a parking-permitting range).

Thus, the vehicle 1 can move from the initial stop position A to the backward movement start position B with no image of the camera 2 displayed on the display 4. Because guidance is provided without relying on an image of the camera 2, the driver finds it easy to pay attention to obstacles, pedestrians, and the like around the vehicle when moving forwards while making a turn. When the vehicle 1 reaches the backward movement start position B, the target parking space S is located behind the vehicle 1 and within a photographing range of the rear view surveillance camera 2.

Figure 4:
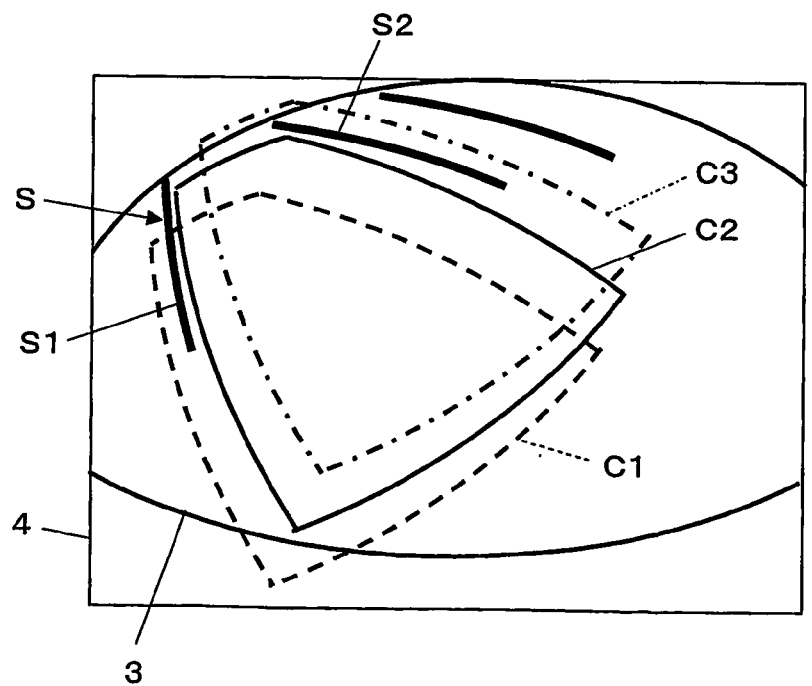
FIG. 4 shows a rear view image of the vehicle displayed on a display of the embodiment.

If the driver shifts the shift lever 5 to the reverse position at the backward movement start position B, the controller 8 senses a shift operation to the reverse position by a detection signal from the shift sensor 11. Then, the controller 8 displays an image captured by the camera 2 as to an area behind the vehicle as well as an estimated vehicle space in the case where the vehicle has moved backwards while maintaining a steering angle detected by the steering angle sensor 9 on the display 4 in a superimposed manner. The estimated vehicle space is displayed, for example, in the form of a vehicle mark representing a contour of an overall external shape of the vehicle 1, at a position where the vehicle 1 is situated after having made a turn by a turning angle (90°-θ) (target turning angle) from the current position with the steering wheel 7 at the current steering angle. That is, as shown in FIG. 4, an image captured by the rear view surveillance camera 2 as to an area behind the vehicle 1, including the rear bumper 3 of the vehicle 1 and the target parking space S, is displayed on a screen of the display 4.

The vehicle mark is also displayed on the screen of the display 4 in a transitional manner according to the steering angle of the steering wheel 7, for example, as indicated by C1 to C3. It should be noted herein that the vehicle marks C1, C2, and C3 respectively represent a state where the vehicle 1 is situated after having made a turn by the angle (90°-θ) from the backward movement start position B with turning radii R1, R2, and R3.

The driver operates the steering wheel 7 so as to establish a suitable positional relation between the estimated vehicle space and the target parking space S on the display 4. Referring to FIG. 3, the vehicle mark C1 as the estimated vehicle space with the turning radius R1 crosses the front frame line S1 of the target parking space S and thus implies an excessively large steering angle of the steering wheel 7, and the vehicle mark C3 with the turning radius R3 crosses a rear frame line S2 of the target parking space S and thus implies an excessively small steering angle of the steering wheel 7. The vehicle mark C2 with the turning radius R2 is suitably positioned with respect to the target parking space S.

Thus, while following the audio guidance issued from the aforementioned speaker 13, the driver moves the vehicle 1 slowly backwards with the steering wheel 7 fixed at such a steering angle as to cause the vehicle mark C2 to be displayed. While the vehicle 1 is moving backwards, the position of the vehicle mark C2 is displayed on the display 4 in a momentarily varying manner so as to keep a mutual relation between the target parking space S and the vehicle mark C2 unchanged. The controller 8 calculates a yaw angle of the vehicle 1 on the basis of an angular speed input from the yaw rate sensor 10, and can recognize the arrival of the vehicle 1 at the position of the vehicle mark C2 as soon as the amount of change in yaw angle from the initial stop position A reaches 90°. The controller 8 provides audio guidance to urge the driver to stop at an appropriate timing before or after the arrival of the vehicle 1 at the position of the vehicle mark C2, and also displays on the display 4 a vehicle width line corresponding to the locus of the vehicle 1 during its rectilinear backward movement when the vehicle 1 is almost reaching the position of the vehicle mark C2. Referring to the vehicle width line displayed on the display 4 in a manner of being superimposed on the target parking space S, the driver finely adjusts the position for making a stop and then stops the vehicle 1 at a suitable position ensuring parallelism between the vehicle 1 and the target parking space S.

While moving backwards, the driver has only to keep the steering wheel 7 fixed and thus finds no difficulty in paying attention to obstacles, pedestrians, and the like around the vehicle.

The controller 8 recognizes the arrival of the vehicle at the vehicle mark C2 upon detecting that the yaw angle has become 90°, namely, that the vehicle has reached a target turning angle after having made a turn from the backward movement start position B. The controller 8 causes the speaker 13 to issue audio guidance such as "Please straighten the steering wheel and move the vehicle backwards to an appropriate position to end parking", and completes a lateral parking guiding operation.

The driver moves straight backwards according to the audio guidance while paying attention on the surrounding circumstances, stops the vehicle at an appropriate position within the target parking space S referring to a relation with an adjacent vehicle and an image displayed on the display 4 as to an area behind the vehicle, and thereby completes a driving operation.

Lateral parking in the target parking space S is thus completed. Now a method of recognizing the above-mentioned backward movement start position B will be described.

Recognition of the backward movement start position B is based on fulfillment of the following two conditions J1 and J2.

The condition J1 is that the center line of the vehicle 1 is not be located in a turning outside region with respect to the center line of the target parking space S if the vehicle 1 moves backwards at a maximum steering angle (i.e., with a minimum turning radius).

The condition J2 is that a part of the vehicle 1 does not protrude to a turning inside region with respect to the target parking space S when the vehicle 1 moves backwards to enter the target parking space S.

Here, the terms "turning outside region" and "turning inside region" respectively refer to the outside and the inside of a turning locus along which the vehicle 1 moves backwards when performing lateral parking. For example, the vehicle 1 moves backwards from the backward movement start position B with its steering wheel turned to the left, trying to park in the target parking space S on the left of the vehicle 1. In this case, the term "a turning outside region" means the right side region of the vehicle 1, and the term "a turning inside region" means the left side region of the vehicle 1.

[Condition J1]

Figure 5:
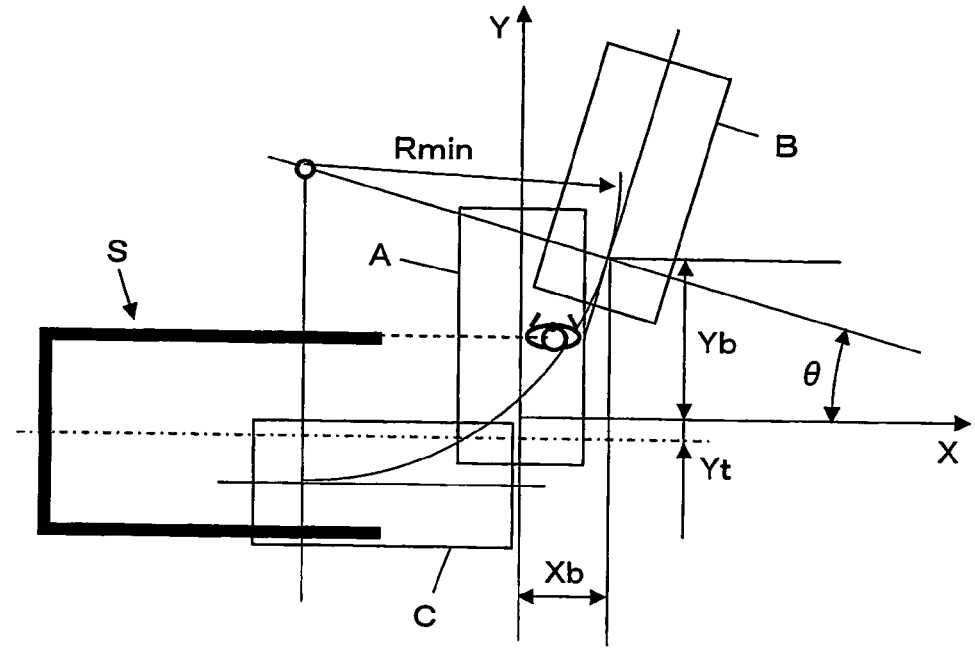
FIGS. 5 and 6 show schematically a method of recognizing a backward movement start position in the embodiment, respectively.

A description will be made with reference to FIG. 5. Taking the center of a rear axle of the initial stop position A as an origin point, the Y-coordinate extends in a forward direction of the vehicle, and the X-axis extends in a rightward direction of the vehicle. The center line of the vehicle 1 is located in a turning outside region with respect to the center line of the target parking space S in moving backwards from the backward movement start position B with a minimum turning radius if the following relation is established.

$$R\min \times (1-\sin\theta) > Yb - Yt \tag{1}$$

It is assumed herein that Rmin represents a minimum turning radius of the center of the rear axle of the vehicle 1, that θ represents a yaw angle at the backward movement start position B (given that the yaw angle is 0 at the initial stop position A), that Yb represents a distance covered by the center of the rear axle in the Y-axis direction from the initial stop position A to the backward movement start position B, and that Yt represents a (signed) distance covered by the center of the rear axle in the Y-axis direction from the center of the target parking space S to the initial stop position A.

The minimum turning radius Rmin and the distance Yt in the Y-axis direction can be defined as constants by judging vehicle parameters and typical parking spaces. Therefore, if the distance Yb in the Y-axis direction and the yaw angle θ are obtained when the vehicle 1 runs from the initial stop position A to the backward movement start position B, it is possible to determine whether or not the above expression (1) is satisfied.

In other words, the condition J1 is satisfied when the following relation is established.

$$Yb > R\min \times (1-\sin\theta) + Yt \tag{1'}$$

[Condition J2]

Figure 6:
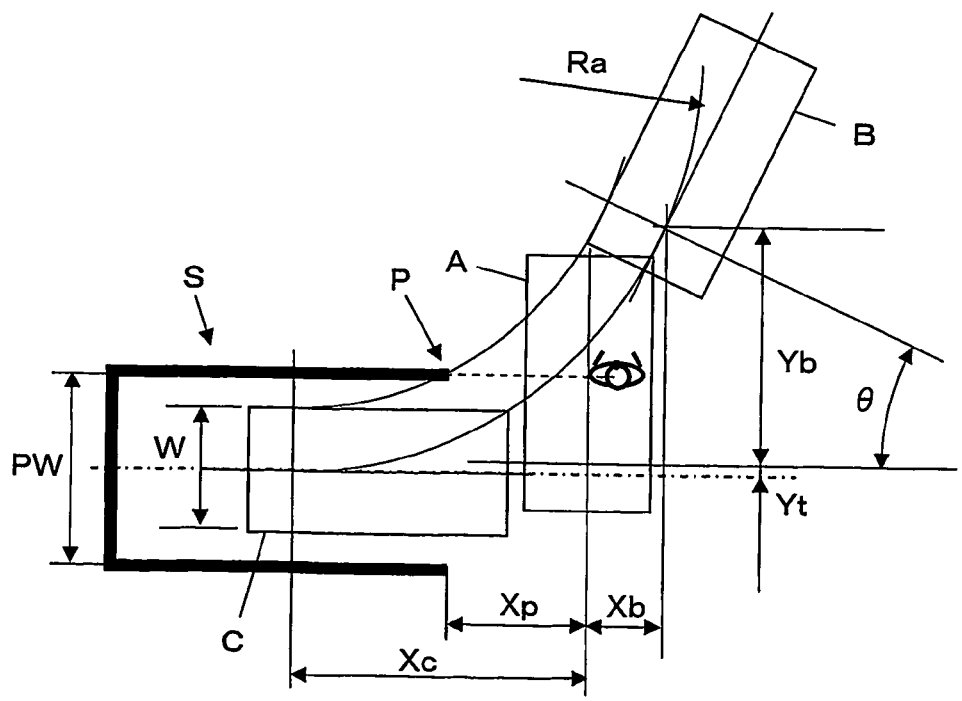

As shown in FIG. 6, when a part of the vehicle 1 just abuts on a front corner portion P of the target parking space S in entering the target parking space S after having moved backwards from the backward movement start position B, the following relations are established given that an origin point is represented the center of the rear axle of the vehicle 1 at the initial stop position A.

$$Ra \times (1-\sin\theta) = Yb - Yt \qquad (2)$$

$$(Ra - W/2)^2 = (Xc - Xp)^2 + (Ra - PW/2)^2 \qquad (3)$$

$$Ra \times \cos\theta = Xb + Xc \qquad (4)$$

It is assumed herein that Ra represents a gyrational radius of the center of the rear axle of the vehicle 1, that θ represents a yaw angle at the backward movement start position B (given that the yaw angle is 0 at the initial stop position A), that Xb represents a distance covered by the center of the rear axle in the X-axis direction from the initial stop position A to the backward movement start position B, that Yb represents a distance covered by the center of the rear axle in the Y-axis direction from the initial stop position A to the backward movement start position B, that Yt represents a (signed) distance covered by the center of the rear axle in the Y-axis direction from the center of the target parking space S to the initial stop position A, that Xp represents a distance covered by the center of the rear axle in the X-axis direction from an entrance end of the target parking space S to the initial stop position A, that Xc represents a distance covered by the center of the rear axle in the X-axis direction from the initial stop position A to the vehicle mark C, that PW represents a width of the target parking space S, and that W represents a width of the vehicle 1.

Xc derived from the equation (4) is assigned to the equation (3) to obtain an equation (3'). Then, Ra derived from the equation (2) is assigned to the equation (3') to obtain an equation (3") which is an equation including θ, Xb, and Yb as variables.

The equation (3") is schematically expressed as follows.

$$Xb = F(\theta, Yb, Kn) \qquad (3''')$$

It should be noted herein that F represents a predetermined function and Kn represents all the necessary constants.

Therefore, the condition J2 is satisfied when the following relation is established.

$$Xb > F(\theta, Yb, Kn) \qquad (3''')$$

The backward movement start position B satisfying both the expression (1') of the condition J1 and the expression (3''') of the condition J2 is recognized as a backward movement start position B complying with the conditions J1 and J2. As is apparent from the expressions (1') and (3'''), if one of the values for Xb, Yb, and θ is determined, possible ranges of the other values are determined. In the present embodiment, a description will be made on the assumption that possible ranges of Xb and Yb with the determined yaw angle θ of the vehicle represent the backward movement start position B.

Figure 7:
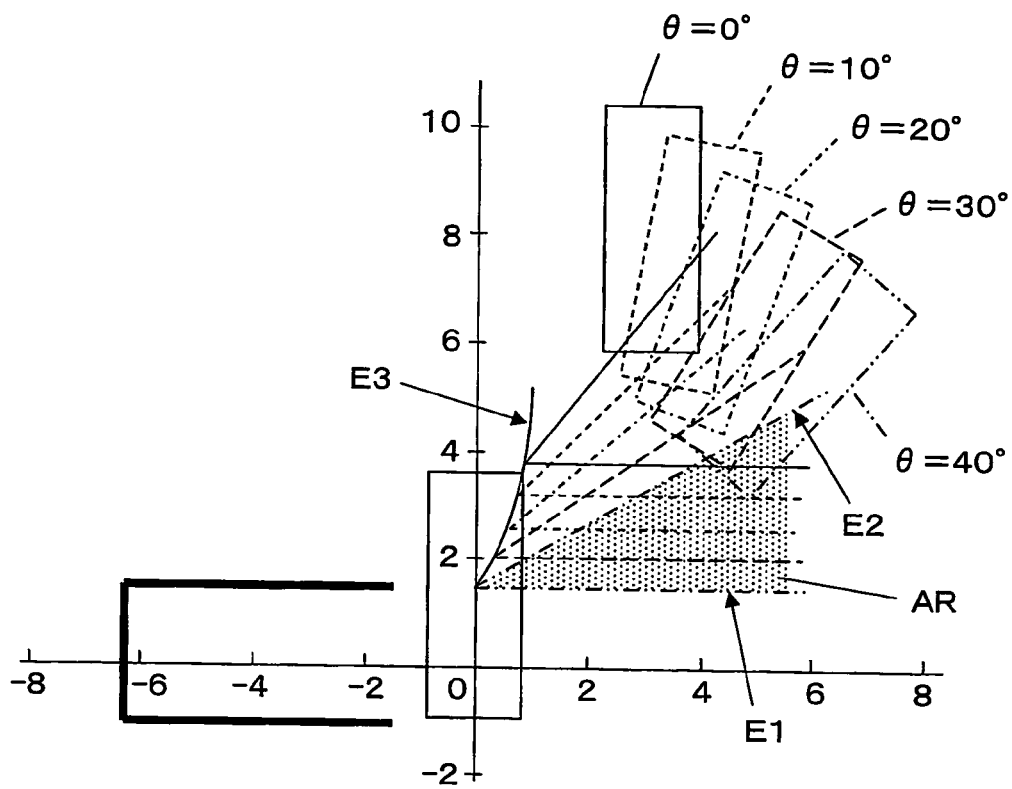
FIG. 7 shows a backward movement start position in the embodiment.

This backward movement start position B is specifically illustrated in FIG. 7. When θ=40°, E1 and E2 represent boundary lines defined by the conditions J1 and J2 respectively. When the center of the rear axle of the vehicle 1 is located within a region AR between the boundary lines E1 and E2, the vehicle 1 is at the Backward movement start position B. Referring to FIG. 7, in addition to the case of θ=40', several regions AR corresponding to various values assumed by the yaw angle θ of the vehicle 1 at the backward movement start position B are illustrated. The range of the backward movement start position B is thus calculated according to the yaw angle θ of the vehicle 1.

In the aforementioned embodiment, the condition J1 is defined on the basis of the center of the vehicle 1 and the center of the target parking spaces. However, the condition J1 may also be defined on the basis of an external portion of the vehicle 1 and an external portion (S2) of the target parking space S.

In this case, the condition J1 is replaced with the following condition J1A.

The condition J1A is that the external portion of the vehicle 1 is not located in a turning outside region with respect to the external portion (S2) of the target parking space S if the vehicle 1 moves backwards at a maximum steering angle (i.e., with a minimum turning radius).

In moving backwards from the backward movement start position B with the minimum turning radius, the external portion of the vehicle 1 is located in a turning outside region with respect to the external portion of the target parking space S if the following relation is established.

$$R\min \times (1-\sin\theta) + W/2 > Yb - Yt + PW/2 \qquad (1A)$$

Therefore, a condition satisfying the condition J1A is not the expression (1') but the following expression.

$$Yb > R\min \times (1-\sin\theta) + W/2 + Yt - PW/2 \qquad (1A')$$

Figure 8:
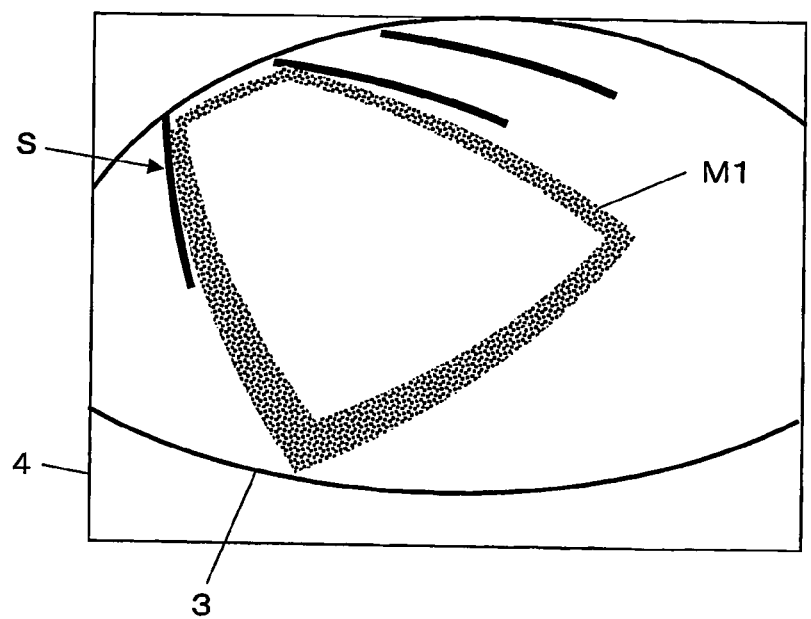
FIGS. 8 to 10 show modification examples of a vehicle mark displayed on a display, respectively.

In the aforementioned embodiment, the vehicle marks representing the contour of the overall external shape of the vehicle 1 are displayed as shown in FIG. 4. However, as shown in FIG. 8, if faraway and nearby regions of a vehicle mark M1 are indicated by thin and thick lines respectively based on the law of perspective, it is easy to determine more instinctively whether or not the estimated vehicle space is suitably positioned in relation to the target parking space S.

Figure 9:
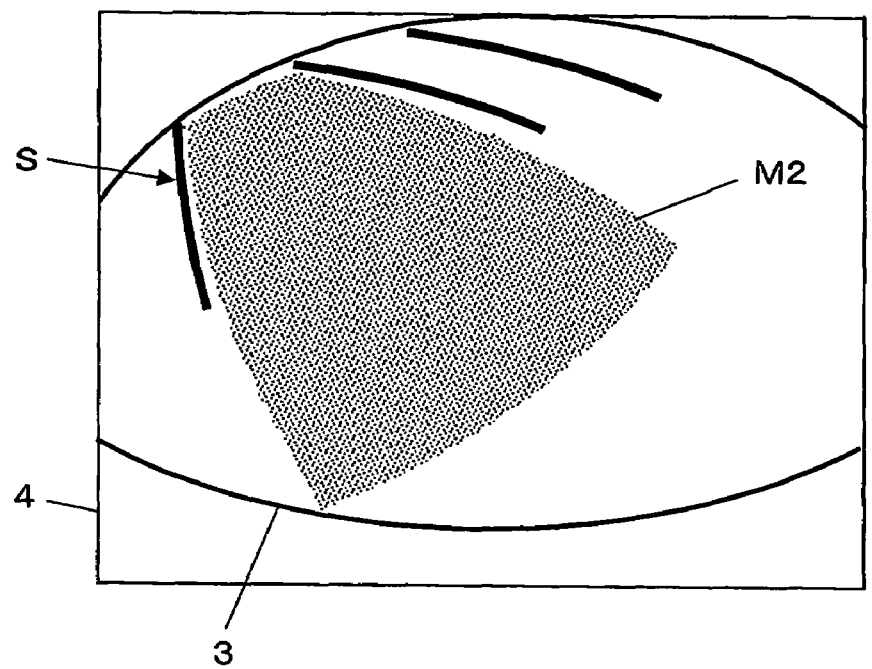

Further, as shown in FIG. 9, a vehicle mark M2 in the form of a semitransparent plane indicating the shape of the vehicle 1 projected substantially onto a road surface can also be displayed as the estimated vehicle space. Because the vehicle mark M2 is semitransparent, parking boundary lines displayed on the display 4 to indicate the target parking space S do not disappear even if the vehicle mark M2 overlaps them, and it is possible to recognize the extent to which the vehicle mark M2 overlaps with the target parking space S.

Figure 10:
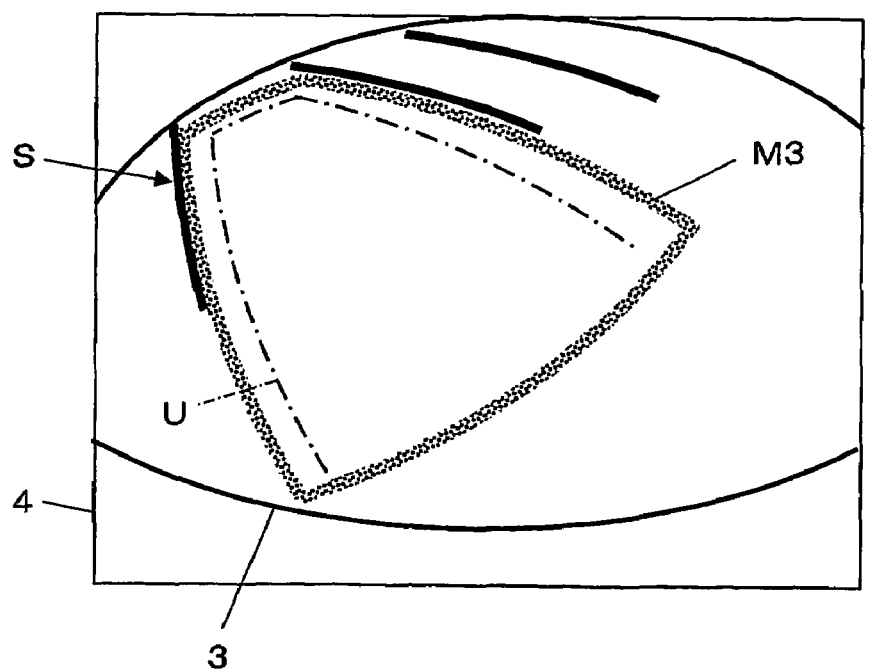

Further, if a vehicle mark M3 that is wider than an actual outline U of the vehicle 1 and substantially equal in width to, for example, the target parking space S is used as shown in FIG. 10, the positional relation between the estimated vehicle space and the target parking space S is more distinctly visible, and it is more easily determined whether or not the estimated vehicle space is suitably positioned in relation to the target parking space S. In this case, the vehicle mark M3 may be expressed as a vehicle mark representing the contour of the overall external shape of vehicle 1 as shown in FIG. 4, a vehicle mark according to the law of perspective as shown in FIG. 8, or a vehicle mark in the form of a semitransparent plane indicating the shape of the vehicle 1 projected substantially onto a road surface as shown in FIG. 9. However, in consideration of that the wide vehicle mark M3 overlaps the parking boundary lines indicating the target parking space S, the use of a semitransparent vehicle mark is preferred.

Figure 11:
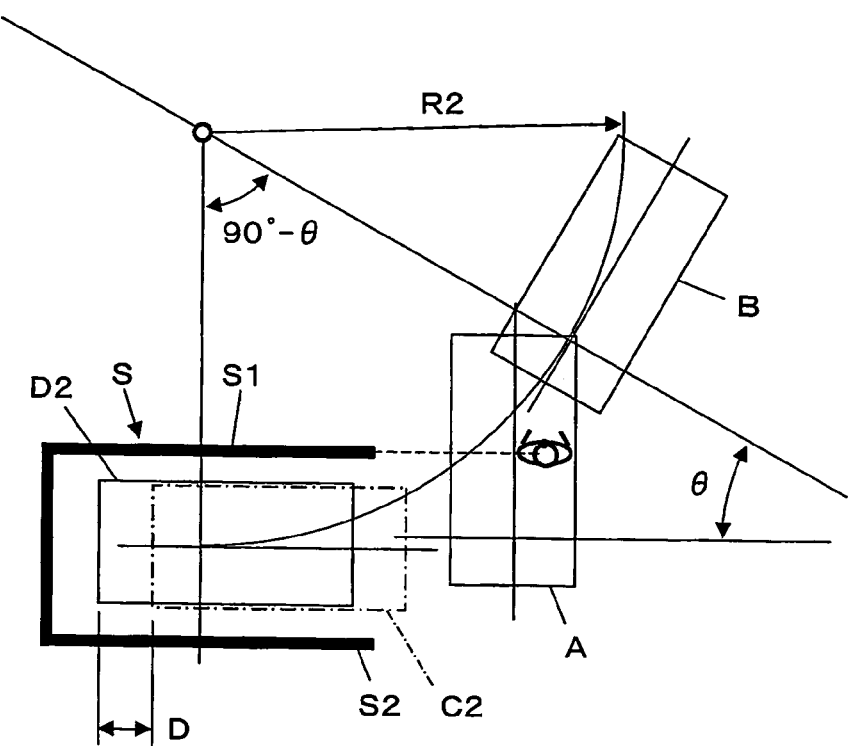
FIG. 11 shows a vehicle mark display position according to another embodiment.

In the aforementioned embodiment, as shown in FIG. 3, the estimated vehicle space such as the vehicle mark C2 is displayed at the position reached by the vehicle 1 after having moved backwards from the backward movement start position B at a constant steering angle while making a turn by a turning angle (90°-θ). However, as shown in FIG. 11, a vehicle mark D2 may be displayed at a position obtained by displacing the position at which the vehicle mark C2 is displayed straight backwards by a predetermined distance D. Thus, even when the vehicle 1 has reached the position corresponding to the completion of the process of moving backwards from the backward movement start position B while making a turn by the turning angle (90°-θ), a part of the vehicle mark D2 is located within the visible range of the camera 2. Therefore, a part of the vehicle mark D2 is displayed on the display 4 in a superimposed manner on the target parking space S, so it is easy to determine whether or not the vehicle 1 has become parallel to the target parking space S.

Figure 12:
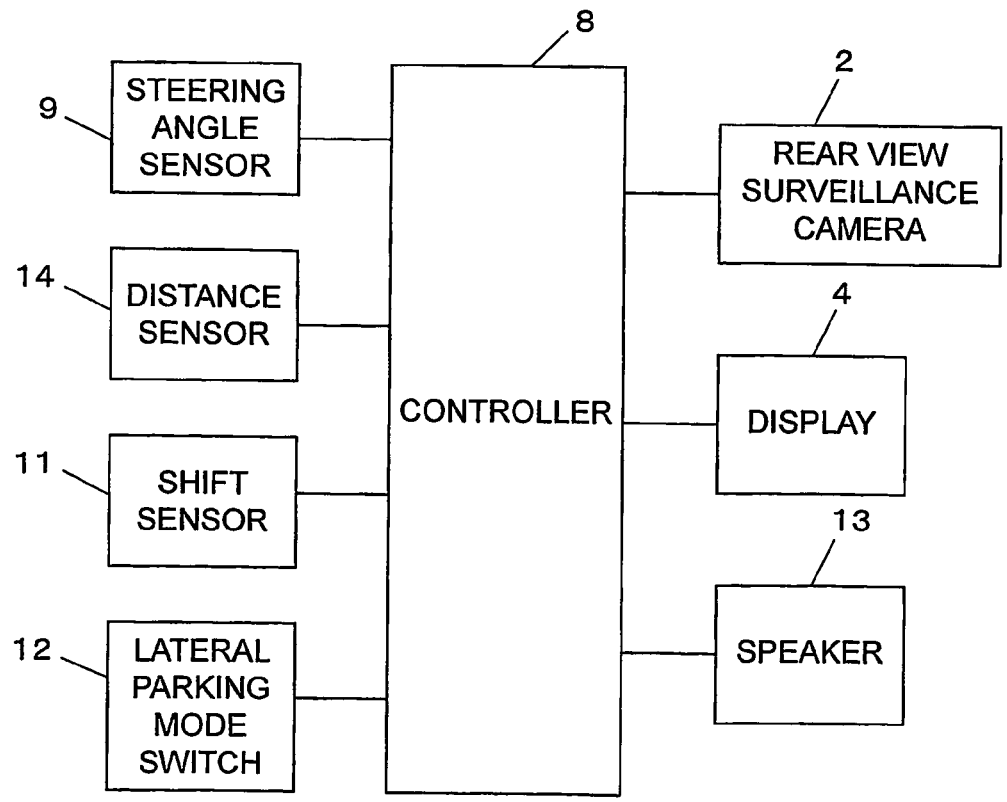
FIGS. 12 and 13 are block diagrams showing the construction of a parking assistance apparatus according to still another embodiments, respectively.

Although a yaw angle of the vehicle 1 is calculated by integrating an angular speed of the vehicle 1 input from the yaw rate sensor 10 in the aforementioned embodiment, this is not obligatory. As shown in FIG. 12, it is also possible to install a distance sensor 14 instead of the yaw rate sensor 10 to calculate a yaw angle of the vehicle 1 based on a steering angle obtained from the steering angle sensor 9 and a moving distance of the vehicle 1 obtained from the distance sensor 14, and provide the driver with guiding information. In this case, the distance sensor 14 and the steering angle sensor 9 constitute the yaw angle detecting means.

Figure 13:
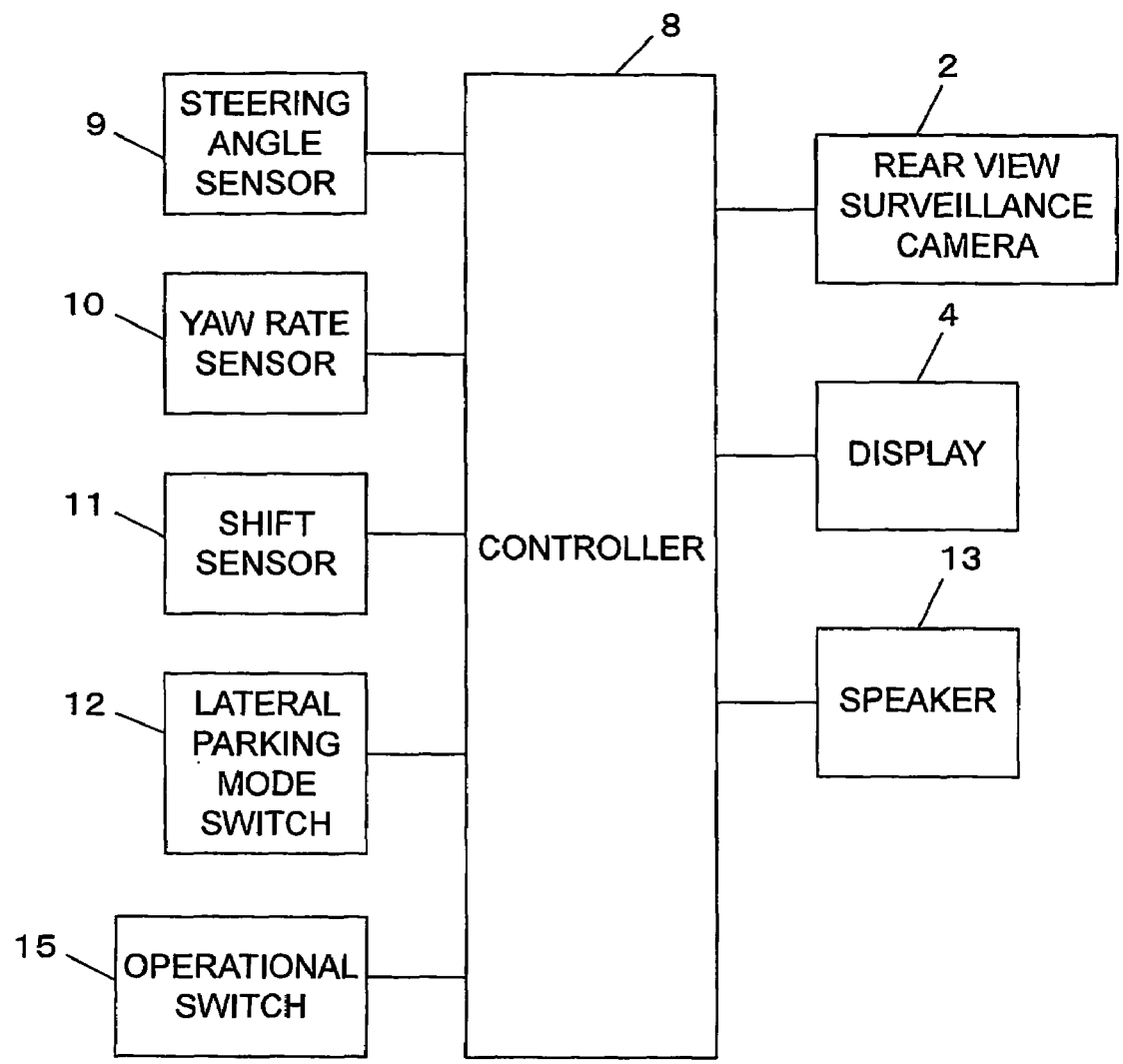

In the case where the vehicle 1 stopped at the initial stop position A is not perpendicular to the target parking space S, there is a fear in that the estimated vehicle space displayed on the display 4 may not be suitably positioned in relation to the target parking space S even if the steering wheel 7 is operated at the backward start position B. To cope with this situation, as shown in FIG. 13, an operational switch 15 may be arranged near the driver seat and connected to the controller 8, and the angle of the estimated vehicle space displayed on the display 4 may be changed through operation of the operational switch 15. In this case, the turning angle in moving backwards from the backward movement start position B to the vehicle mark C is increased or reduced depending on the amount of change in the angle of the estimated vehicle space displayed on the display 4 and with respect to the angle (90°-θ) in the case where the vehicle 1 is perpendicular to the target parking space S. In this manner, more accurate parking guidance can be provided in accordance with the angle of the vehicle 1 at the initial stop position A.

Instead of throwing the lateral parking mode switch 12 at the initial stop position A, the lateral parking mode switch 12 may be thrown on the way that the vehicle 1 moves straight forwards toward the initial stop position A, and the controller 8 may recognize the initiation of parking guidance by detecting a change in the yaw angle of the vehicle 1 when the vehicle 1 moves forwards from the initial stop position A toward the backward movement start position B while making a turn with the steering wheel 7 being turned. Instead of throwing the lateral parking mode switch 12, a microphone and a voice recognition unit may be installed for issuing commands to the controller 8 by means of voice recognition. Thus, the operation performed by the driver is simplified.

The controller 8 is not required to exist as a dedicated unit for parking assistance but may be incorporated into a navigation system or the like. This makes it possible not only to save the trouble of installing the controller 8 in the vehicle 1 but also to reduce the cost of the system for reasons of common use of a box-shaped body and sensor groups, the lack of the necessity to prepare wirings, and the like.

Although the aforementioned embodiment deals with lateral parking on the left of a passage, lateral parking on the right side can also be performed in a similar manner.

Guidance on the attainment of the backward movement start position B may be provided as soon as or some time after the vehicle 1 has entered the region AR.

Instead of providing guidance to urge the driver to stop, it is also acceptable to provide guidance to announce that the driver can stop the vehicle 1 while it is in the region AR. Thus, the driver can perform the operation of stopping the vehicle 1 at a more or less freely selected timing.

The initial stop position A is not limited to the position 0.5 to 1 m apart from the entrance of the target parking space S. The region AR may be calculated according to an initial stop position A determined in advance.

When the vehicle 1 stops at the initial stop position A, it is not indispensable that the driver see the frame line S1 right beside the vehicle 1. For instance, the driver may see the frame line S2 right beside the vehicle 1. In this case, even if the steering angle in moving forwards while making a turn is small, the vehicle 1 can easily reach the region AR.

Furthermore, when the vehicle 1 stops at the initial stop position A, the driver may view the center of the target parking space S right beside the vehicle 1. This is suited for the case of parking the vehicle in a parking lot with no parking frame.

One of the aforementioned three states (the vehicle 1 is located right beside the frame line S1, the frame line S2, or the center of the target parking space S) may be selected by a switch when the vehicle 1 is stopped at the initial stop position A. In this case, according to the circumstances in each parking lot, the process of parking can be initiated from an initial stop position A ensuring easier operation.

Further, although the region AR is calculated using the two boundary lines E1 (the condition J1 or J1A) and E2 (the condition J2), it is also appropriate to define, instead of the boundary line E2, a boundary line E3 representing intersection points between the boundary lines E1 and E2 corresponding to respective yaw angles θ, for example, as shown in FIG. 7 (i.e., a curve tracing intersection points between the boundary lines E1 and E2, or a straight line passing through the intersection point between the boundary lines E1 and E2 at θ=0° and intersecting the boundary line E1 at right angles), and to calculate the region AR using the boundary lines E1 and E3. In this case, the region AR is located above the boundary line E1 and on the right of the boundary line E3 in FIG. 7.

Further, the backward movement start position B may not necessarily be calculated according to the yaw angle of the vehicle 1. It is also appropriate to store data on the region AR corresponding to the yaw angle in advance, and to determine, by referring to the data, whether or not the vehicle 1 has reached the backward movement start position B.

Further, it is not obligatory to calculate the region AR according to the yaw angle of the vehicle 1 or store the data on the region AR corresponding to the yaw angle. For example, the region AR may be calculated according to Xb, or data on the region AR corresponding to Xb may be stored in advance. Alternatively, the region AR may be calculated according to Yb or data on the region AR corresponding to Yb may be stored in advance.

As described hereinabove, the present invention allows a vehicle to be guided to a backward movement start position where parking in a target parking space is possible, thereby making parking in the target parking space reliable and easy.

The invention claimed is:

1. A parking assistance apparatus for providing assistance in a driving operation of parking a vehicle in a target parking space by moving the vehicle forwards from an initial stop position with a steering wheel turned, stopping the vehicle at a backward movement start position, and moving the vehicle backwards with the steering wheel turned in the opposite direction, the parking assistance apparatus comprising:

a camera for capturing an image behind the vehicle;
   a display arranged near a driver seat of the vehicle;
   a steering angle sensor for detecting a steering angle;
   yaw angle detection means for detecting a yaw angle of the vehicle;
   guiding means for issuing guiding information on the driving operation to a driver; and
   a controller for acquiring a momentary position of the vehicle and a momentary yaw angle of the vehicle based on a steering angle detected by the steering angle sensor and a yaw angle of the vehicle detected by the yaw angle detection means when the vehicle moves forwards from the initial stop position, for determining during the forward moving of the vehicle whether the vehicle has entered a region where is the backward movement start position defined by a parking-permitting position and a parking permitting yaw angle against the target parking space or not, for issuing guiding information to stop the vehicle via the guiding means as soon as or some time after it is determined that the vehicle has entered the region where is the backward movement start position, for displaying the image captured by the camera on the display when the vehicle moves backwards, and for displaying on the display in a superimposed manner an estimated vehicle space in the case where the vehicle moves backwards with a current steering angle detected by the steering angle sensor being maintained, the estimated vehicle space moving according to the current steering angle, to thereby inform the driver of a suitable steering angle in moving the vehicle backwards.

2. A parking assistance apparatus according to claim 1, wherein the estimated vehicle space is displayed based on a yaw angle of the vehicle and a steering angle of the vehicle at the backward movement start position; and the driver operates the steering wheel at the backward movement start position to establish a suitable positional relation between the estimated vehicle space and the target parking space both displayed on the display, and starts moving the vehicle backwards in this state.

3. A parking assistance apparatus according to claim 2, wherein the estimated vehicle space is a contour representing an overall external shape of the vehicle.

4. A parking assistance apparatus according to claim 3, wherein the contour constituting the estimated vehicle space is shown thin and thick in its faraway and nearby regions respectively according to the law of perspective.

5. A parking assistance apparatus according to claim 2, wherein the estimated vehicle space is displayed with a semitransparent plane in the shape of an image of the vehicle projected substantially onto a road surface.

6. A parking assistance apparatus according to claim 2, wherein the estimated vehicle space is displayed with a width greater than an actual width of the vehicle.

7. A parking assistance apparatus according to claim 2, wherein the estimated vehicle space is displayed at a position obtained by further displacing a position, which is reached by the vehicle after having moved backwards from the backward movement start position with its steering angle maintained while making a turn by a predetermined angle, straight backwards by a predetermined distance.

8. A parking assistance apparatus according to claim 1, wherein the backward movement start position is within a range where a center line of the vehicle is not located in a turning outside region with respect to a center line of the target parking space even if the vehicle moves backwards while maintaining a maximum steering angle, and any part of the vehicle does not protrude to a turning inside region with respect to the target parking space in entering the target parking space even if the vehicle moves backwards while maintaining a predetermined steering angle.

9. A parking assistance apparatus according to claim 1, wherein the backward movement start position is within a range where any part of the vehicle does not located in a turning outside region with respect to the target parking space even if the vehicle moves backwards while maintaining a maximum steering angle, and any part of the vehicle does not protrude to a turning inside region with respect to the target parking space in entering the target parking space even if the vehicle moves backwards while maintaining a predetermined steering angle.

10. A parking assistance apparatus according to claim 1, wherein the controller calculates a predetermined region according to a yaw angle of the vehicle and recognizes arrival of the vehicle at the backward movement start position when the vehicle is located within the predetermined region thus calculated.

11. A parking assistance apparatus according to claim 1, wherein the controller stores in advance a predetermined region according to a yaw angle of the vehicle and recognizes arrival of the vehicle at the backward movement start position when the vehicle is located within the predetermined region thus stored.

12. A parking assistance apparatus according to claim 1, wherein the controller determines, after having issued guiding information to stop the vehicle, whether or not a position where the vehicle has actually been stopped coincides with the backward movement start position, and if the position is determined to be inappropriate, informs the driver of this inappropriateness by means of the guiding means.

13. A parking assistance apparatus according to claim 1, wherein the controller changes display of the estimated vehicle space according to the yaw angle of the vehicle so that a mutual positional relation on an actual road surface between the image captured by the camera and the estimated vehicle space does not change when the vehicle is moving backwards from the backward movement start position.

14. A parking assistance apparatus according to claim 1, wherein the controller calculates a target turning angle required until the completion of a turn on the basis of a yaw angle of the vehicle at the backward movement start position, and issues the guiding information to end the turn via the guiding means when the vehicle reaches the target turning angle in moving backwards from the backward movement start position.

15. A parking assistance apparatus according to claim 14, further comprising:

an operational switch for changing an angle of the estimated vehicle space,
   the controller correcting a value of the target turning angle according to a degree of change in the angle of the estimated vehicle space.

16. A parking assistance apparatus according to claim 1, further comprising:

a setting switch for setting a reference position for the yaw angle of the vehicle at the initial stop position.

17. A parking assistance apparatus according to claim 1, wherein the yaw angle detection means is constituted by a yaw rate sensor.

18. A parking assistance apparatus according to claim 1, wherein the yaw angle detection means is constituted by a distance sensor for measuring a moving distance of the vehicle and the steering angle sensor.

19. A parking assistance apparatus according to claim 1, wherein the guiding means is constituted by a speaker.

20. A parking assistance apparatus according to claim 1, wherein the initial stop position is set at a predetermined position in relation to the target parking space.

21. A parking assistance apparatus according to claim 1, wherein the controller recognizes an initiation of parking guidance in one of the timings in which the vehicle stops at the initial stop position and in which the vehicle moves forwards from the initial stop position while making a turn.

* * * * *

UNITED STATES PATENT AND TRADEMARK OFFICE
CERTIFICATE OF CORRECTION

PATENT NO. : 7,375,651 B2
APPLICATION NO. : 10/558061
DATED : May 20, 2008
INVENTOR(S) : Kazunori Shimazaki et al.

It is certified that error appears in the above-identified patent and that said Letters Patent is hereby corrected as shown below:

Column 2, line 4, please delete "forwards" and insert therefore -- forward --;

Column 2, line 45, please delete "another embodiments" and insert therefore -- other embodiments --;

Column 3, line 16, please delete "data include" and insert therefore -- data includes --;

Column 3, line 41, please delete "vehicle as well as" and insert therefore -- vehicle, as well as --;

Column 3, line 66, please delete "move forwards" and insert therefore -- move forward --;

Column 4, lines 5 and 6, please delete "1 forwards" and insert therefore -- 1 forward --;

Column 4, line 24, please delete "in a midcourse" and insert therefore -- in midcourse --;

Column 4, lines 25 and 45, please delete "forwards" and insert therefore -- forward --;

Column 7, line 3, please delete "represented the center" and insert therefore -- represented at the center --;

Column 7, line 63, please delete "Backward" and insert therefore -- backward --;

Column 7, line 65, please delete "$\theta=40'$" and insert therefore -- $\theta=40°$ --;

Column 8, line 5, please delete "spaces" and insert therefore -- space S --;

Column 8, line 59, please delete "consideration of that" and insert therefore -- consideration that --;

Column 9, lines 49 and 52, please delete "forwards" and insert therefore -- forward --;

Column 10, line 20, please delete "forwards" and insert therefore -- forward --.

UNITED STATES PATENT AND TRADEMARK OFFICE
CERTIFICATE OF CORRECTION

PATENT NO. : 7,375,651 B2  
APPLICATION NO. : 10/558061  
DATED : May 20, 2008  
INVENTOR(S) : Kazunori Shimazaki et al.

It is certified that error appears in the above-identified patent and that said Letters Patent is hereby corrected as shown below:

In the Claims

In Claim 1, column 11, line 4, please delete "vehicle forwards" and insert therefore
-- vehicle forward --;

In Claim 1, column 11, line 22, please delete "forwards" and insert therefore
-- forward --;

In Claim 1, column 11, line 26, please delete "parking permitting" and insert therefore
-- parking-permitting --;

In Claim 9, column 12, line 16, please delete "does not located" and insert therefore
-- is not located --;

In Claim 21, column 14, line 9, please delete "forwards" and insert therefore
-- forward --.

Signed and Sealed this

Twenty-seventh Day of October, 2009

David J. Kappos  
*Director of the United States Patent and Trademark Office*